United States Patent
Lee et al.

(10) Patent No.: US 9,020,283 B2
(45) Date of Patent: Apr. 28, 2015

(54) ELECTRONIC DEVICE AND METHOD FOR SPLITTING IMAGE

(71) Applicant: Zhongshan Innocloud Intellectual Property Services Co., Ltd., Zhongshan (CN)

(72) Inventors: Chung-I Lee, New Taipei (TW); Chien-Fa Yeh, New Taipei (TW); Ming-Hua Tang, New Taipei (TW)

(73) Assignee: Zhongshan Innocloud Intellectual Property Services Co., Ltd., Zhongshan (CN)

( * ) Notice: Subject to any disclaimer, the term of this patent is extended or adjusted under 35 U.S.C. 154(b) by 54 days.

(21) Appl. No.: 13/917,684

(22) Filed: Jun. 14, 2013

(65) Prior Publication Data

US 2014/0133575 A1   May 15, 2014

(30) Foreign Application Priority Data

Nov. 13, 2012   (TW) ................. 101142267

(51) Int. Cl.
| | |
|---|---|
| G06K 9/36 | (2006.01) |
| G06K 9/46 | (2006.01) |
| H04N 19/50 | (2014.01) |
| H04N 19/105 | (2014.01) |
| H04N 19/119 | (2014.01) |
| H04N 19/14 | (2014.01) |
| H04N 19/176 | (2014.01) |
| H04N 19/96 | (2014.01) |

(52) U.S. Cl.
CPC ....... *H04N 19/00569* (2013.01); *H04N 19/105* (2013.01); *H04N 19/119* (2013.01); *H04N 19/14* (2013.01); *H04N 19/176* (2013.01); *H04N 19/50* (2013.01); *H04N 19/96* (2013.01)

(58) Field of Classification Search
None
See application file for complete search history.

(56) References Cited

U.S. PATENT DOCUMENTS

| | | | | |
|---|---|---|---|---|
| 5,654,771 | A | * | 8/1997 | Tekalp et al. ................. 348/699 |
| 2008/0031325 | A1 | * | 2/2008 | Qi ............................. 375/240.09 |
| 2011/0274162 | A1 | * | 11/2011 | Zhou et al. ............... 375/240.03 |
| 2012/0236334 | A1 | * | 9/2012 | Suzuki ........................... 358/1.9 |

OTHER PUBLICATIONS

Tyagi et al., "Image segmentation on a 2-D array by a directed Split and Merge procedure", IEEE Transactions on signal processing, vol. 40, No. 11, 1992, pp. 2804-2813.*
Farrelle, Recursive block coding for image data compression, 1990, Springer-Verlag New York Inc., pp. 198-202.*
Chan et al., "Variable size block matching motion compensation with application to video coding", Proc. Inst. Elect. Eng., vol. 137, No. 4, pp. 205-212, 1990.*
Horwitz et al., "Picture segmentation by a tree traversal algorithm," J. ACM, vol. 23, pp. 368-388, Apr. 1976.*

* cited by examiner

*Primary Examiner* — Aaron W Carter
*Assistant Examiner* — Feng Niu
(74) *Attorney, Agent, or Firm* — Novak Druce Connolly Bove + Quigg LLP

(57) ABSTRACT

In a method for splitting an image for encoding purposes, a largest coding unit (LCU) of the image is obtained, the LCU divided into a plurality of 2N×2N blocks, the 2N×2N blocks examined sequentially, and a determination made as to whether or not the current 2N×2N block needs to be split according to a pixel variance of the current 2N×2N block. The method further determines whether a block merging operation needs to be executed for the LCUs according to an average value of pixels of each of the 2N×2N blocks if the current 2N×2N block does not need to be split.

21 Claims, 9 Drawing Sheets

ELECTRONIC DEVICE AND METHOD FOR SPLITTING IMAGE

BACKGROUND

1. Technical Field

Embodiments of the present disclosure relate to image coding technology, and particularly to an electronic device and method for splitting an image using the electronic device.

2. Description of Related Art

High efficiency video coding (i.e., HEVC/H.265) is currently used as a video coding method by the Joint Collaborative Team on Video Coding (JCT-VC). One goal of the team is to improve compression performance relative to existing standards—in the range of 50% bit rate reduction for equal perceptual video quality.

In a coding process, an image is divided into a plurality of largest coding units (LCU) having a specified size, and each LCU is divided into a plurality of coding units (CU) blocks having different sizes using a recursive algorithm according to a quad tree structure. An optimized split mode of each CU block is determined when the recursive process is ended. Because all the CU blocks of different sizes in the LCU needs to be tested in the recursive process, thus, the computing time and the complexity of the recursive process is very high. Therefore, a more efficient method for splitting an image is desired.

DETAILED DESCRIPTION

All of the processes described below may be embodied in, and fully automated via, functional code modules executed by one or more general purpose electronic devices or processors. The code modules may be stored in any type of non-transitory computer-readable medium or other storage device. Some or all of the methods may alternatively be embodied in specialized hardware. Depending on the embodiment, the non-transitory computer-readable medium may be a hard disk drive, a compact disc, a digital video disc, a tape drive or other storage medium.

Figure 1:
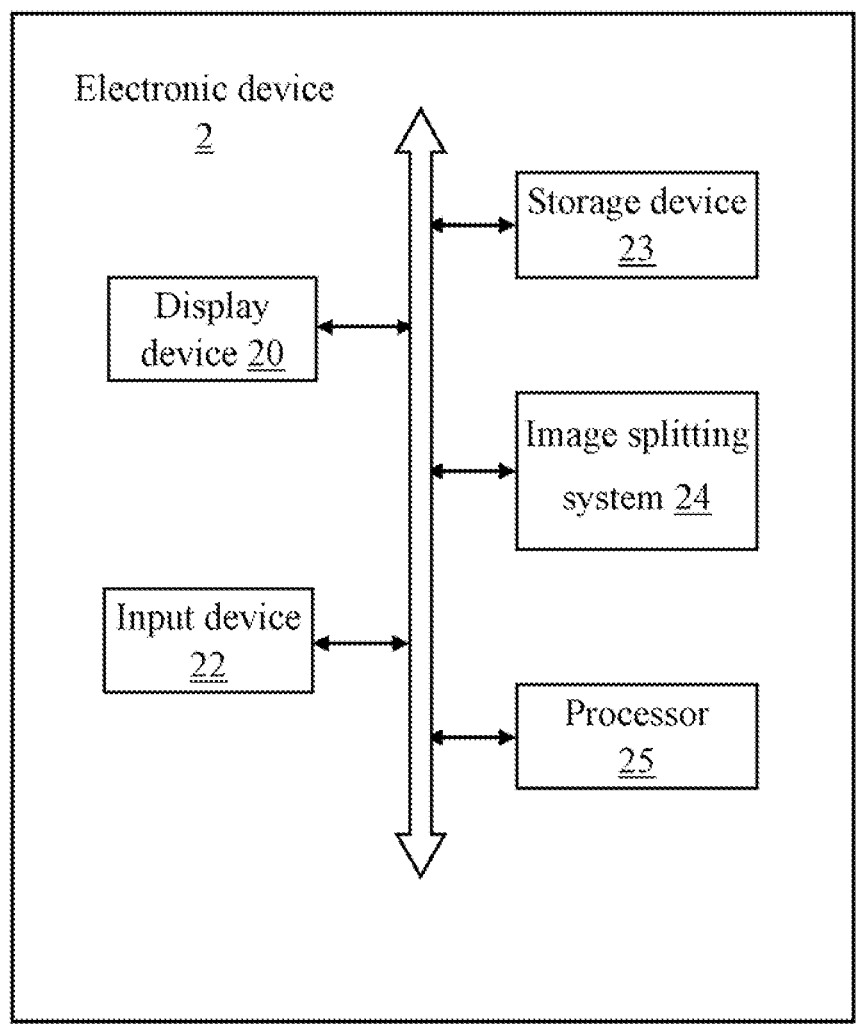
FIG. 1 is a block diagram of one embodiment of an electronic device including an image splitting system.

FIG. 1 is a block diagram of one embodiment of an electronic device 2 including an image splitting system 24. In the embodiment, the electronic device 2 further includes a display device 20, an input device 22, a storage device 23, and at least one processor 25. The electronic device 2 may be a computer, a smart phone or a personal digital assistant (PDA). FIG. 1 illustrates only one example of an electronic device 2, that may include more or fewer components than illustrated, or have a different configuration of the various components in other embodiments.

The display device 20 displays decoded images, and the input device 22 may be a mouse or a keyboard used to input computer readable data. The storage device 23 may be a non-volatile computer storage chip that can be electrically erased and reprogrammed, such as a hard disk or a flash memory card.

In one embodiment, the image splitting system 24 may include computerized instructions in the form of one or more programs that are executed by the at least one processor 25 and stored in the storage device 23 (or memory). A description of the image splitting system 24 will be given in the following paragraphs.

Figure 2:
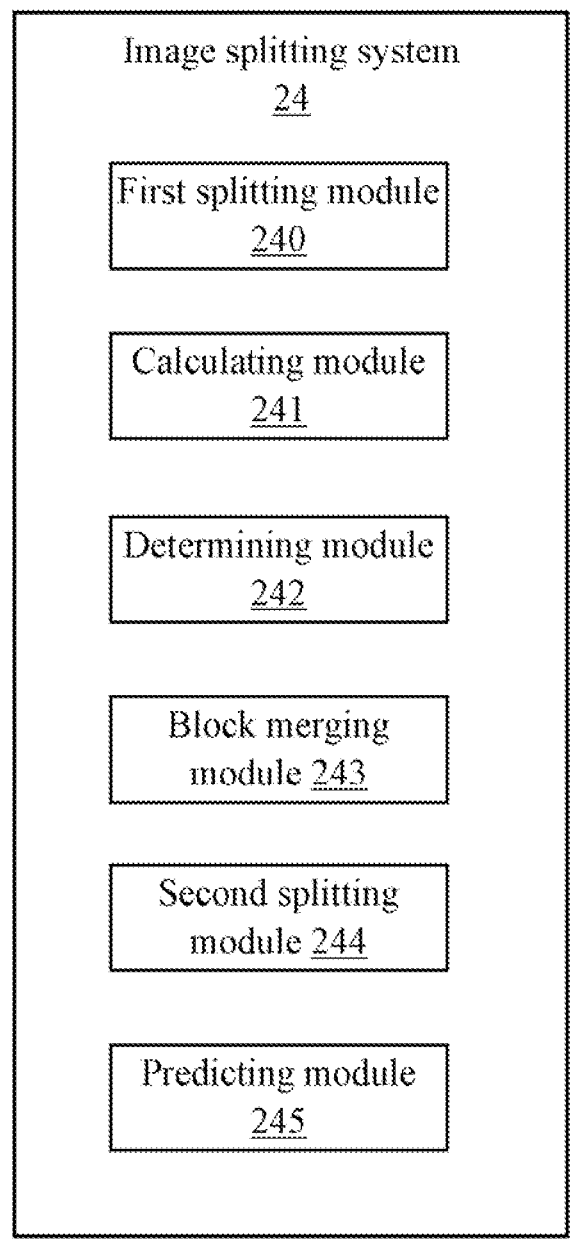
FIG. 2 is a schematic diagram of function modules of the image splitting system included in the electronic device.

FIG. 2 is a block diagram of function modules of the image splitting system 24 included in the electronic device 2. In one embodiment, the image splitting system 24 may include one or more modules, for example, a first splitting module 240, a calculating module 241, a determining module 242, a block merging module 243, a second splitting module 244, and a predicting module 245. In general, the word "module", as used herein, refers to logic embodied in hardware or firmware, or to a collection of software instructions, written in a programming language. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable medium include flash memory and hard disk drives.

Figure 3A:
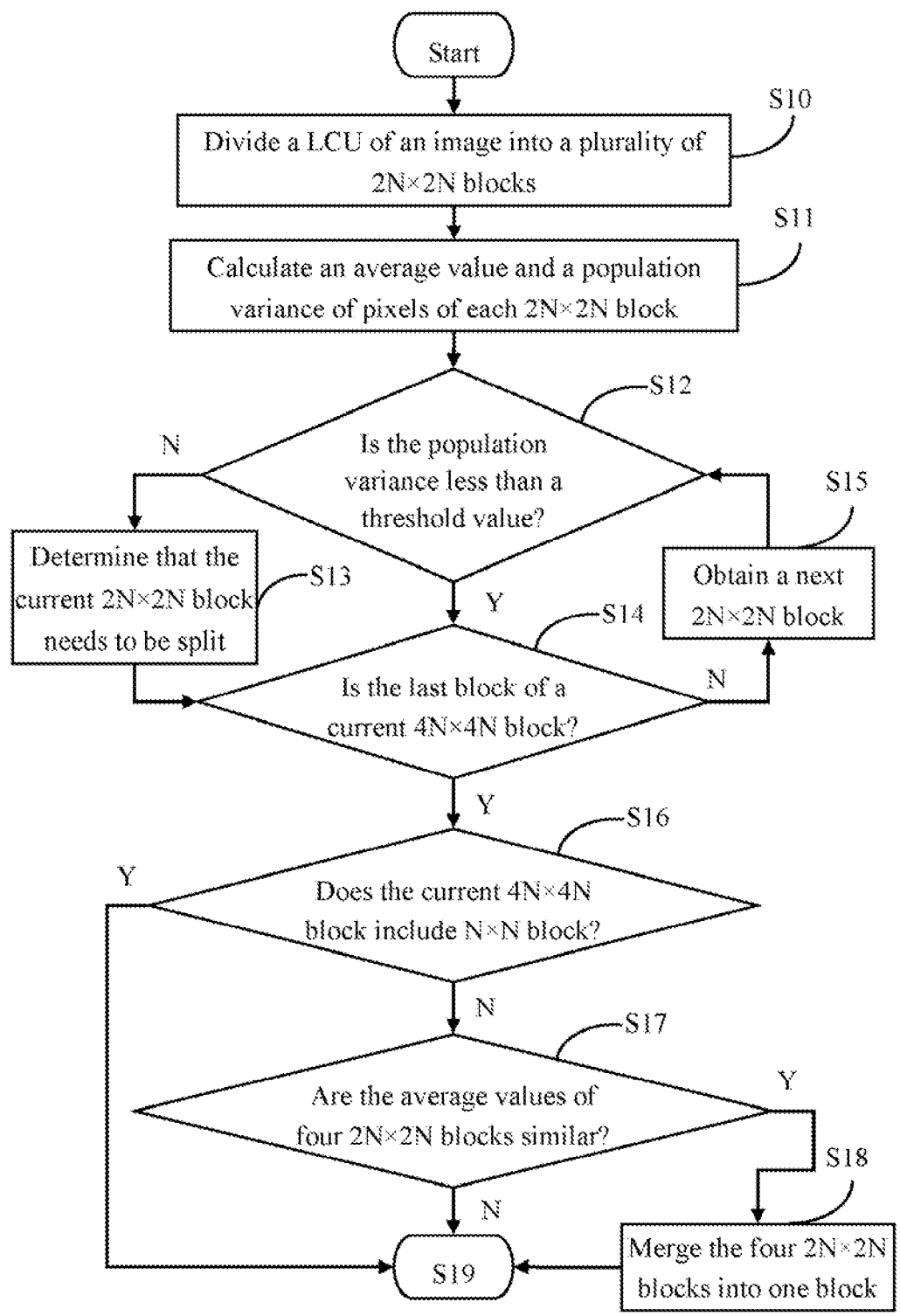
FIG. 3A and FIG. 3B are flowcharts of a first embodiment of a method for splitting an image using the electronic device.
Figure 3B:
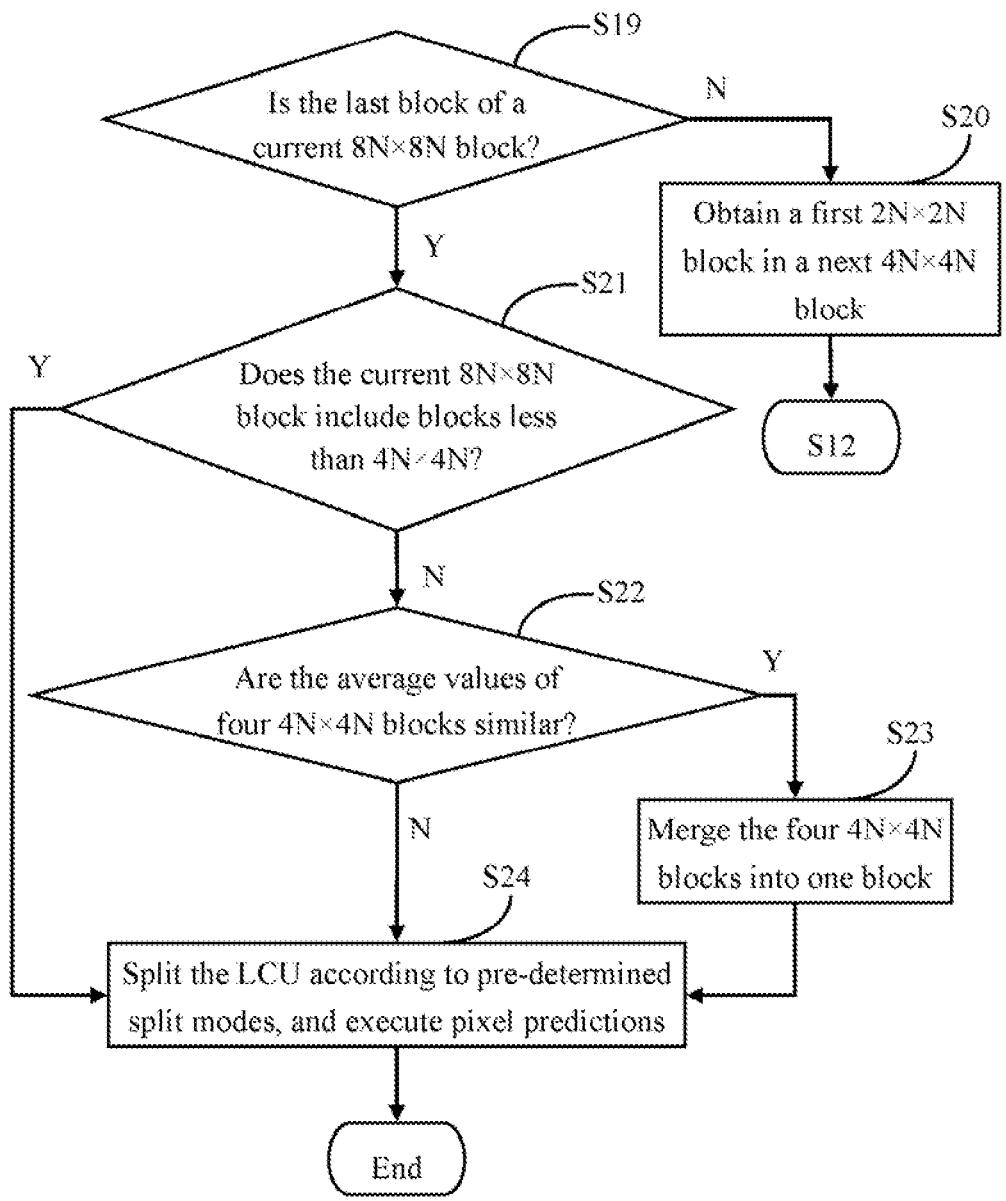

FIG. 3A and FIG. 3B are flowcharts of a first embodiment of a method for splitting an image using the electronic device 2. Depending on the embodiment, additional steps may be added, others removed, and the ordering of the steps may be changed.

Figure 4:
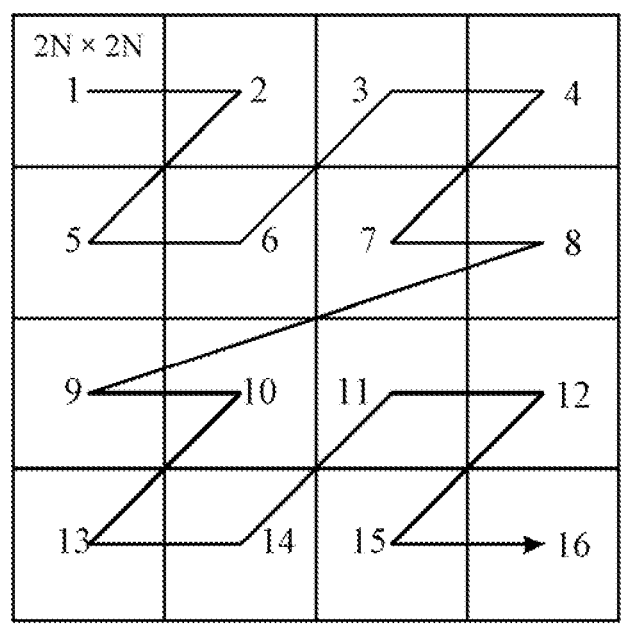
FIG. 4 is an exemplary schematic diagram of a Z-shape sequence.

In step S10, the first splitting module 240 obtains an image from the storage device 23 or other storage medium, obtains a largest coding unit (LCU) of the image, and divides the LCU into a plurality of 2N×2N blocks. In one embodiment, the image is divided into a plurality of LCUs of a specified size (e.g., 64×64) when the image is encoded. In a first embodiment, one LCU of the image is illustrated to be divided, other LCUs of the image may be split using the same method. For example, a number of "N" (e.g., 2N×2N) is equal to eight, and the LCU is divided into sixteen 16×16 blocks (referring to FIG. 4). In FIG. 4, the serial numbers (e.g., from 1 to 16) of the blocks are numbered according to a sequence from above to down and from let to right. In other embodiment, the serial numbers of the blocks may be numbered according to a Z-shape sequence as shown in FIG. 4.

In step S11, the calculating module 241 calculates an average value of pixels and a population variance of pixels (hereinafter referred to as "pixel variance") of each 2N×2N block according to a recursive order in each recursive level. For example, as shown in FIG. 4, the recursive order may be a Z-shape sequence. The average value of pixels of the 2N×2N block may be an average of luminance (luma) values (e.g., grayscale values) of all the pixels in the 2N×2N block. In other embodiments, the average value of pixels of the 2N×2N block may be calculated using chrominance (chroma) values of the pixels.

In a first embodiment, the pixel variance of the 2N×2N block is calculated by a method as follows. The calculating module 241 calculates a deviation between the luminance value of each pixel in the 2N×2N block and the average value of pixels of the 2N×2N block, obtains a sum value of a square of the deviation, divides the sum value by a total number of pixels in the 2N×2N block, and determines a result of division (division result) as the pixel variance of the 2N×2N block.

For example, if grayscale is selected as the luminance value, and a value of "N" is equal to eight (N=8), the calculating module 241 processes each 16×16 block to calculate an average of the grayscale values of 256 pixels in each 16×16 block, and determines the average of the grayscale values of each as the average value of pixels of each 16×16 block. When the average value of pixels of one 16×16 block is calculated, the pixel variance of the 16×16 block is subsequently calculated using the above-mentioned method.

In step S12, the determining module 242 obtains a current 2N×2N block (e.g., a first block in FIG. 4) according to the recursive order (e.g., the Z-shape sequence), and determines a split mode of the current 2N×2N block by determining whether the pixel variance of the current 2N×2N block is less than a threshold value (e.g., 400). In the first embodiment, the split modes include a continuation mode and a termination mode. For example, the continuation mode means that the current 2N×2N block needs to be continually split into four sub-blocks. The termination mode means that the current 2N×2N block does not need to be split.

If the pixel variance of the current 2N×2N block is greater than or equal to the threshold value, the determining module 242 determines that the luminance values (e.g., grayscale values) of the pixels in the current 2N×2N block have low consistency (i.e., the edge information in the current 2N×2N block is messy), and the split mode of the current 2N×2N block is the continuation mode, the current 2N×2N block needs to be split continually, and the procedure goes to step S13.

If the pixel variance of the current 2N×2N block is less than the threshold value, the determining module 242 determines that the luminance values (e.g., grayscale values) of the pixels in the current 2N×2N block have high consistency (i.e., the edge information in the current 2N×2N block is well regulated), and the split mode of the current 2N×2N block is the termination mode, the current 2N×2N block does not need to be split, and steps S14 to S23 are executed to determine whether a block merging operation needs to be performed on the LCU upon the condition that the current 2N×2N block does not need to be split. In the first embodiment, the block merging operation includes a first merging of 2N×2N block (referring to steps S14-S18) and a second merging of 4N×4N block (referring to steps S19-S23).

In step S13, the determining module 242 determines that the current 2N×2N block needs to be split into four N×N blocks each having a same size. Then, the procedure goes to step S14 to determine whether the block merging operation needs to be performed on the LCU.

In step S14, the block merging module 243 determines whether the current 2N×2N block is the last block of a current 4N×4N block. For example, as shown in FIG. 4, supposing that the current 2N×2N block is the first block, thus the current 4N×4N block includes four 2N×2N blocks of the first block, the second block, the fifth block, and the sixth block, where the sixth block is the last block of the current 4N×4N block according to the Z-shape sequence.

If the current 2N×2N block is not the last block of the current 4N×4N block, step S15 is executed. In step S15, the block merging module 243 obtains a next 2N×2N block from the LCU according to the predetermined sequence (e.g., the Z-shape sequence), determines the next 2N×2N block to be an updated current 2N×2N block, and the procedure returns to step S12.

If the current 2N×2N block is the last block of the current 4N×4N block, step S16 is executed. In step S16, the block merging module 243 determines whether one of the 2N×2N blocks in the current 4N×4N block is split by determining whether the current 4N×4N block includes N×N block. If the current 4N×4N block includes the N×N block, the block merging module 243 determines that at least one of the 2N×2N blocks in the current 4N×4N block is split, the procedure goes to step S19 to begin determination as to whether or not the current 2N×2N block is the last block of a current 8N×8N block.

If the current 4N×4N block does not include any N×N block, the block merging module 243 determines that none of the 2N×2N blocks in the current 4N×4N block are split, the procedure goes to step S17. In step S17, the block merging module 243 determines whether the average values of pixels of four 2N×2N blocks in the current 4N×4N block are similar.

Figure 5:
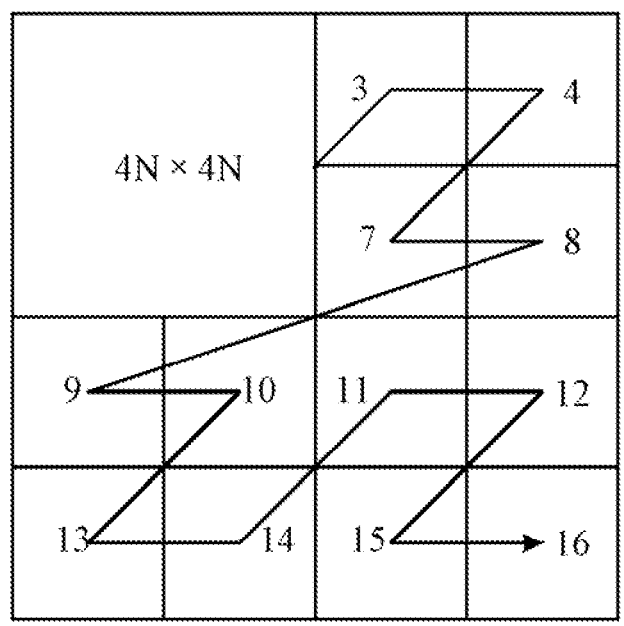
FIG. 5 is an exemplary schematic diagram of merging four 2N×2N blocks of FIG. 4 to one 4N×4N block.

If a deviation from the average values of pixels between every two 2N×2N blocks of the current 4N×4N block is less than a preset value (e.g., twenty), the block merging module 243 determines that the average values of pixels of the four 2N×2N blocks in the current 4N×4N block are similar, and step S18 is executed. In step S18, the block merging module 243 executes the first merging of 2N×2N block by merging the four 2N×2N blocks in the current 4N×4N block into one block (a merged block). For example, as shown in FIG. 4, when the first merging of 2N×2N block is executed, the first block, the second block, the fifth block, and the sixth block are merged to generate a 4N×4N block (referring to FIG. 5). Then the procedure goes to step S19.

If the deviation from the average values of pixels between two 2N×2N blocks of the current 4N×4N block is greater than or equal to the preset value, the block merging module 243 determines that the average values of pixels of the four 2N×2N blocks in the current 4N×4N block are not similar, and step S19 is executed. In step S19, the block merging module 243 determines whether or not the current 2N×2N block is the last block of a current 8N×8N block (i.e., the LCU). For example, as shown in FIG. 4, the last block of the current 8N×8N block is the sixteenth block according to the Z-shape sequence.

If the current 2N×2N block is not the last block of the current 8N×8N block, step S20 is executed. In step S20, the block merging module 243 obtains a first 2N×2N block in a next 4N×4N block from the LCU according to the predetermined sequence (e.g., the Z-shape sequence), determines that the first 2N×2N block in the next 4N×4N block is an updated current 2N×2N block, and the procedure returns to step S12. For example, as shown in FIG. 4, the next 4N×4N block includes the third block, the fourth block, the seventh block, and the eighth block, thus the updated current 2N×2N block is the third block.

If the current 2N×2N block is the last block of the current 8N×8N block, step S21 is executed. In step S21, the block merging module 243 determines whether or not all of the 2N×2N blocks in the LCU have been merged into the 4N×4N block by determining whether the current 8N×8N block includes blocks less than 4N×4N (e.g., contains an N×N block or a 2N×2N block). If the current 8N×8N block includes blocks less than 4N×4N, the block merging module 243 determines that at least one of the 2N×2N blocks in the LCU has not been merged to the 4N×4N block, and the block merging module 243 determines that there is no need to execute the second merging of 4N×4N block, and then the procedure goes to step S24.

If the current 8N×8N block includes no blocks less than 4N×4N, the block merging module 243 determines that all of the 2N×2N blocks in the LCU have been merged to the 4N×4N block, and the procedure goes to step S22. In step S22, the block merging module 243 determines whether the average values of pixels of four 4N×4N blocks in the current 8N×8N block are similar.

Figure 6:
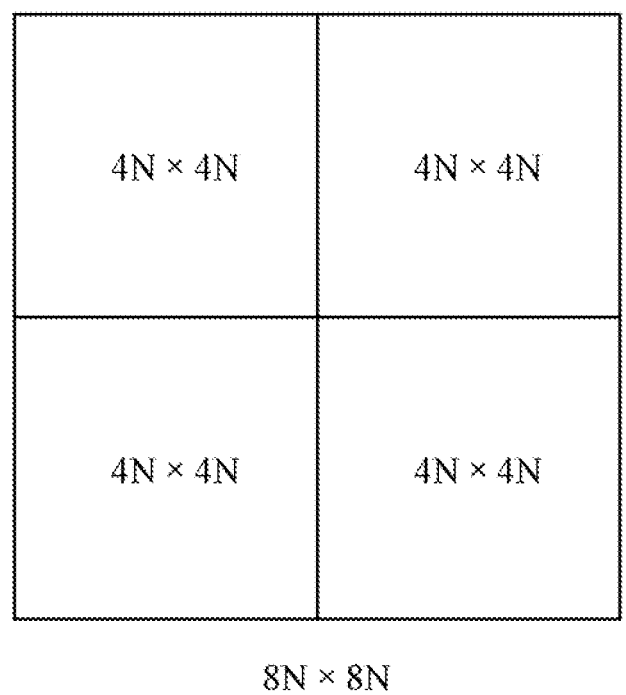
FIG. 6 is an exemplary schematic diagram of merging four 4N×4N blocks of FIG. 5 to one 8N×8N block.

If a deviation from the average values of pixels between every two 4N×4N blocks of the current 8N×8N block is less than a preset value (e.g., twenty), the block merging module 243 determines that the average values of pixels of the four 4N×4N blocks in the current 8N×8N block are similar, and step S23 is executed. In step S23, the block merging module 243 executes the second merging of 4N×4N block by merging the four 4N×4N blocks in the current 8N×8N block into one block. That is, the LCU does not need to be split. For example, as shown in FIG. 6, when the second merging of 4N×4N block is executed, the four 4N×4N blocks are merged into an 8N×8N block. Then the procedure goes to step S24.

If the deviation from the average values of pixels between two 4N×4N blocks of the current 8N×8N block is greater than or equal to the preset value, the block merging module 243 determines that the average values of pixels of the four 4N×4N blocks in the current 8N×8N block are not similar, and the block merging module 243 determines that there is no need to execute the second merging of 4N×4N block, then the procedure goes to step S24.

In step S24, the second splitting module 244 splits the LCU according to the split modes pre-determined in steps S12-S23. Thus, the number of recursions for splitting the LCU using a recursive method of a quad tree is reduced. Then, the predicting module 245 executes a pixel prediction for the blocks of the LCU (e.g. a N×N block of the LCU). The pixel prediction may be an intra prediction or an inter prediction.

In the first embodiment, the predicting module 245 executes the pixel prediction for the split blocks or the merged blocks of the LCU, but does not execute the pixel prediction for all of the blocks in the LCU using the recursive method of the quad tree, thus, the number of recursions in the quad tree is reduced and the predicting time and the complexity of the recursive process is reduced, so that a speed of the image encoding is improved. In addition, a block merging operation is executed simultaneously when the block split operation is executed, the small blocks are merged into bigger blocks when the complexity of the image is lower and the color information (e.g., grayscale values) in the blocks of the image are well regulated, so that the predicting number and time are reduced.

In the first embodiment, the block splitting operation and the block merging operation are executed simultaneously. In a second embodiment, the block splitting operation is executed but the block merging operation is not executed (referring to FIG. 7).

Figure 7:
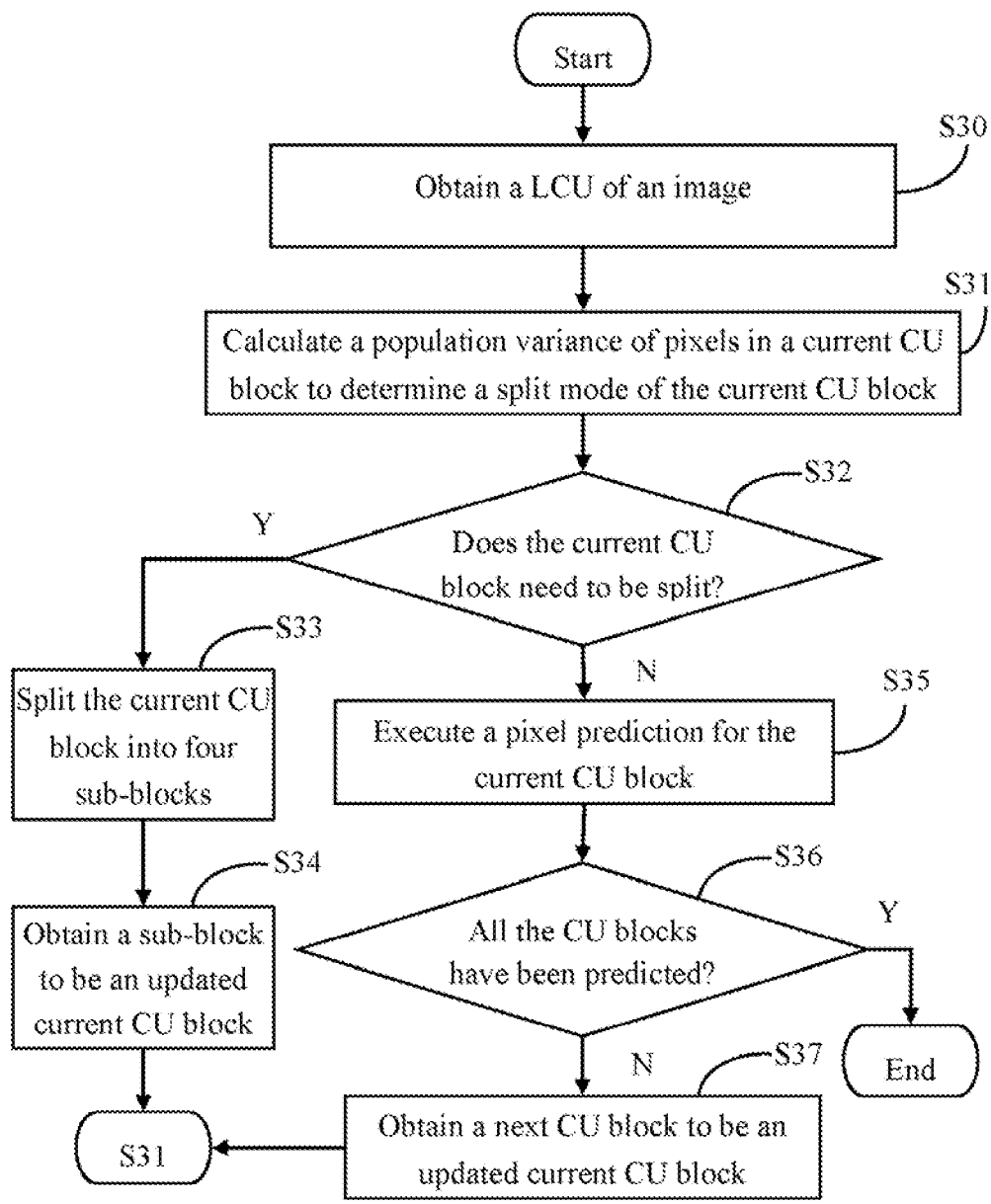
FIG. 7 is a flowchart of a second embodiment of a method for splitting an image using the electronic device.

FIG. 7 is a flowchart of a second embodiment of a method for splitting an image using the electronic device 2. Depending on the embodiment, additional steps may be added, others removed, and the ordering of the steps may be changed.

In step S30, the calculating module 241 obtains an image from the storage device 23 or other storage medium, obtains a largest coding unit (LCU) of the image. In one embodiment, the image is divided into a plurality of LCUs of a specified size (e.g., 64×64) when the image is encoded, and each LCU is divided into a plurality of coding unit (CU) blocks of different sizes using a recursive algorithm according to a quad tree structure.

Figure 8:
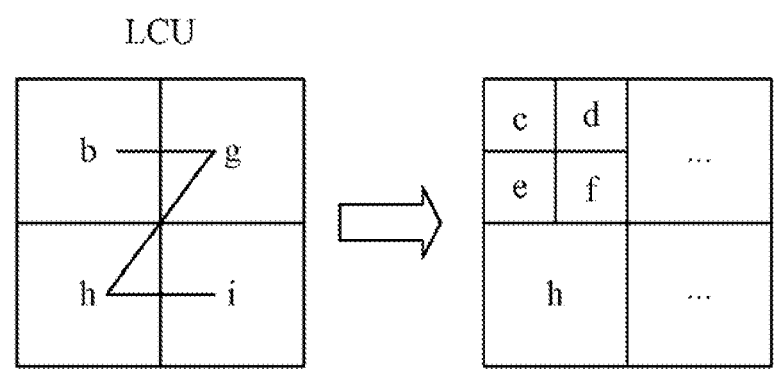
FIG. 8 is an exemplary schematic diagram of image splitting of a current CU block.

A size of a CU block is variable at different recursive levels. For example, as shown in FIG. 8, the LCU is divided into four CU blocks "b", "g", "h", and "i," having a first size at a first recursive level, and the first CU block "b" is further divided into four smaller CU blocks "c", "d", "e", and "f," at a second recursive level. In the second embodiment, one LCU of the image is illustrated to be explained, other LCUs of the image may be split using a same method.

In step S31, the calculating module 241 calculates a population variance of pixels (hereinafter referred to as "pixel variance") of a current CU block according to a recursive order in each recursive level.

In step S32, the determining module 242 determines whether the current CU block needs to be split according to the pixel variance of the current CU block. In the initial splitting operation, the current CU block is the whole LCU.

In the second embodiment, if the pixel variance of the current CU block is greater than or equal to a threshold value (e.g., 400), the determining module 242 determines that the current CU block needs to be split continually (referring to the CU block "b" in FIG. 8), and the procedure goes to step S33. If the pixel variance of the current CU block is less than the threshold value, the determining module 242 determines that the current CU block does not need to be split, so that the splitting operation of the current CU block is ended (referring to the CU block "h" in FIG. 8), and the procedure goes to step S35.

In step S33, the second splitting module 244 splits the current CU block into four sub-blocks. For example, as shown in FIG. 8, the current CU block is divided into four small CU blocks "b", "g", "h", and "i," at the first recursive level.

In step S34, the second splitting module 244 obtains a specified sub-block from the current CU block, determines the specified sub-block to be an updated current CU block, and the procedure returns to step S31. The specified sub-block may be a top-left sub-block of the current CU block. For example, as shown in FIG. 8, when the current CU block is split into four sub-blocks "b", "g", "h", and "i," at the first recursive level, the sub-block "b" is determined to be the updated current CU block, and the updated current CU block "b" is split into four small CU blocks "c", "d", "e", and "f," at the second recursive level.

In step S35, the second splitting module 244 stops splitting the current CU block, and the predicting module 245 executes the pixel prediction for the current CU block. The pixel prediction may be the intra prediction or an inter prediction.

In step S36, the second splitting module 244 determines whether all of the CU blocks in the LCU have been predicted. If all of the CU blocks in the LCU have been predicted, the procedure ends. If any CU block in the LCU has not been predicted, the procedure goes to step S37.

In step S37, the second splitting module 244 obtains a next CU block from the LCU according to a predetermined sequence (e.g., the Z-shape sequence), determines the next CU block to be an updated current CU block, and the procedure returns to step S31. For example, as shown in FIG. 8, when the CU block "e" has been executed the pixel prediction, the CU block "f" which has a same size of the CU block "e" is determined to be the updated current CU block. When the CU block "f" has been executed the pixel prediction, the CU block "b" which is an upper level of the CU block "f" has been executed completely, and the CU block "g" having a same size of the CU block "b" is determined to be the updated current CU block.

In the second embodiment, a split mode of a current CU block is predetermined every time before a splitting operation of the current CU block. The calculating module 241 calculates the pixel variance of the current CU block, and the determining module 242 determines a split mode (e.g., a continuation mode and a termination mode) of the current CU block according to the calculation of the calculating module 241. Then, the second splitting module 244 determines whether the current CU block needs to be split continually (the continuation mode) or the splitting of the current CU block stopped (the termination mode) according to the split mode determined by the determining module 242.

In other embodiments, the split modes of all of the CU blocks in the LCU may be pre-determined before splitting the LCU. The calculating module 241 calculates the pixel variance of each CU block in the LCU previously, and the determining module 242 determines a split mode of each CU block according to the calculation of the calculating module 241. Then, the second splitting module 244 splits specified CU blocks which need to be split according to the pre-determined split mode of each CU block. The splitting operation refers to the method described in FIG. 7.

In the first embodiment, the block merging operation includes a first merging of 2N×2N block (referring to steps S14-S18) and a second merging of 4N×4N block (referring to steps S19-S23). In a third embodiment, the second merging of 4N×4N block may not be executed. If only the first merging of 2N×2N block is executed, the method determines whether the current 2N×2N block is the last block of the LCU when a determining result in step S16 is positive (i.e. Yes), that is, the current 4N×4N block includes the N×N block, or where a determining result in step S17 is negative (i.e., No), that is, the average values of pixels of the four 2N×2N blocks in the current 4N×4N block are not similar, or that step S18 has been executed.

If the current 2N×2N block is the last block of the LCU, step S24 is executed. If the current 2N×2N block is not the last block of the LCU, the block merging module 243 obtains a next 2N×2N block from the LCU according to the predetermined sequence (e.g., the Z-shape sequence), determines the next 2N×2N block to be an updated current 2N×2N block, and the procedure returns to step S12.

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A method for splitting an image using an electronic device, the method comprising:
    obtaining a largest coding unit (LCU) of the image, and dividing the LCU into a plurality of 2N×2N blocks;
    calculating a pixel variance and an average value of pixels of each of the 2N×2N blocks;
    obtaining a current 2N×2N block from the LCU according to a recursive order, determining whether the current 2N×2N block needs to be split according to the pixel variance of the current 2N×2N block;
    splitting the current 2N×2N block into four N×N blocks upon the condition that the current 2N×2N block needs to be split; and
    determining, using a processor, to whether a block merging operation needs to be executed for the LCU according to the average value of pixels of each of the 2N×2N blocks upon the condition that the current 2N×2N block does not need to be split, and executing the block merging operation when the block merging operation is needed.

2. The method according to claim 1, wherein determining whether the current 2N×2N block needs to be split is performed by:
    determining that the current 2N×2N block needs to be split upon the condition that the pixel variance of the current 2N×2N block is greater than or equal to a threshold value; or determining that the current 2N×2N block does not need to be split upon the condition that the pixel variance of the current 2N×2N block is less than the threshold value.

3. The method according to claim 1, wherein the block merging operation comprising a first merging of 2N×2N block, the first merging of 2N×2N block is executed by:
    determining whether the current 2N×2N block is the last block of a current 4N×4N block;
    determining whether the current 4N×4N block comprises N×N block upon the condition that the current 2N×2N block is the last block of the current 4N×4N block;
    determining whether the average values of pixels of four 2N×2N blocks in the current 4N×4N block are similar upon the condition that the current 4N×4N block does not comprise N×N block;
    executing the first merging by merging the four 2N×2N blocks in the current 4N×4N block into one block upon the condition that the average values of pixels of the four 2N×2N blocks in the current 4N×4N block are similar.

4. The method according to claim 3, wherein the average values of pixels of the four 2N×2N blocks in the current 4N×4N block are determined to be similar upon the condition that a deviation of the average values of pixels between every two 2N×2N blocks of the current 4N×4N block is less than a preset value.

5. The method according to claim 3, wherein the first merging of 2N×2N block is executed by:
    determining that the block merging operation is ended upon the condition that the current 4N×4N block comprises N×N block or that the average values of pixels of the four 2N×2N blocks in the current 4N×4N block are not similar.

6. The method according to claim 3, wherein the first merging of 2N×2N block is executed by:
    determining whether a second merging of 4N×4N block is needed upon the condition that the current 4N×4N block comprises N×N block, or that the average values of pixels of the four 2N×2N blocks in the current 4N×4N block are not similar, or that the first merging is executed.

7. The method according to claim 6, wherein the second merging of 4N×4N block is executed by:
    determining whether the current 2N×2N block is the last block of a current 8N×8N block;
    determining whether the current 8N×8N block comprises blocks less than 4N×4N upon the condition that the current 2N×2N block is the last block of the current 8N×8N block;
    determining whether the average values of pixels of four 4N×4N blocks in the current 8N×8N block are similar upon the condition that the current 8N×8N block does not comprise blocks less than 4N×4N block;
    executing the second merging by merging the four 4N×4N blocks in the current 8N×8N block into one block upon the condition that the average values of pixels of the four 4N×4N blocks in the current 8N×8N block are similar.

8. An electronic device, comprising:
    a processor;
    a storage device storing a plurality of instructions, which when executed by the processor, causes the processor to:

obtain a largest coding unit (LCU) of an image, and divide the LCU into a plurality of 2N×2N blocks;

calculate a pixel variance and an average value of pixels of each of the 2N×2N blocks;

obtain a current 2N×2N block from the LCU according to a recursive order, determine whether the current 2N×2N block needs to be split according to the pixel variance of the current 2N×2N block;

split the current 2N×2N block into four N×N blocks upon the condition that the current 2N×2N block needs to be split; and determine whether a block merging operation needs to be executed for the LCU according to the average value of pixels of each of the 2N×2N blocks upon the condition that the current 2N×2N block does not need to be split, and execute the block merging operation when the block merging operation is needed.

9. The electronic device according to claim 8, wherein determining whether the current 2N×2N block needs to be split is performed by:

determining that the current 2N×2N block needs to be split upon the condition that the pixel variance of the current 2N×2N block is greater than or equal to a threshold value; or determining that the current 2N×2N block does not need to be split upon the condition that the pixel variance of the current 2N×2N block is less than the threshold value.

10. The electronic device according to claim 8, wherein the block merging operation comprising a first merging of 2N×2N block, the first merging of 2N×2N block comprising steps of:

determining whether the current 2N×2N block is the last block of a current 4N×4N block;

determining whether the current 4N×4N block comprises N×N block upon the condition that the current 2N×2N block is the last block of the current 4N×4N block;

determining whether the average values of pixels of four 2N×2N blocks in the current 4N×4N block are similar upon the condition that the current 4N×4N block does not comprise N×N block;

executing the first merging by merging the four 2N×2N blocks in the current 4N×4N block into one block upon the condition that the average values of pixels of the four 2N×2N blocks in the current 4N×4N block are similar.

11. The electronic device according to claim 10, wherein the average values of pixels of the four 2N×2N blocks in the current 4N×4N block are determined to be similar upon the condition that a deviation of the average values of pixels between every two 2N×2N blocks of the current 4N×4N block is less than a preset value.

12. The electronic device according to claim 10, wherein the first merging of 2N×2N block is executed by:

determining that the block merging operation is ended upon the condition that the current 4N×4N block comprises N×N block or that the average values of pixels of the four 2N×2N blocks in the current 4N×4N block are not similar.

13. The electronic device according to claim 10, wherein the first merging of 2N×2N block is executed by:

determining whether a second merging of 4N×4N block is needed upon the condition that the current 4N×4N block comprises N×N block, or that the average values of pixels of four 2N×2N blocks in the current 4N×4N block are similar, or that the first merging is executed.

14. The electronic device according to claim 13, wherein the second merging of 4N×4N block is executed by:

determining whether the current 2N×2N block is the last block of a current 8N×8N block;

determining whether the current 8N×8N block comprises blocks less than 4N×4N upon the condition that the current 2N×2N block is the last block of the current 8N×8N block;

determining whether the average values of pixels of four 4N×4N blocks in the current 8N×8N block are similar upon the condition that the current 8N×8N block does not comprise blocks less than 4N×4N block;

executing the second merging by merging the four 4N×4N blocks in the current 8N×8N block into one block upon the condition that the average values of pixels of the four 4N×4N blocks in the current 8N×8N block are similar.

15. A non-transitory storage medium having stored thereon instructions that, when executed by a processor of an electronic device, causes the electronic device to perform a method for splitting an image, the method comprising:

obtaining a largest coding unit (LCU) of the image, and dividing the LCU into a plurality of 2N×2N blocks;

calculating a pixel variance and an average value of pixels of each of the 2N×2N blocks;

obtaining a current 2N×2N block from the LCU according to a recursive order, determining whether the current 2N×2N block needs to be split according to the pixel variance of the current 2N×2N block;

splitting the current 2N×2N block into four N×N blocks upon the condition that the current 2N×2N block needs to be split; and determining whether a block merging operation needs to be executed for the LCU according to the average value of pixels of each of the 2N×2N blocks upon the condition that the current 2N×2N block does not need to be split, and executing the block merging operation when the block merging operation is needed.

16. The non-transitory storage medium according to claim 15, wherein determining whether the current 2N×2N block needs to be split is performed by:

determining that the current 2N×2N block needs to be split upon the condition that the pixel variance of the current 2N×2N block is greater than or equal to a threshold value; or determining that the current 2N×2N block does not need to be split upon the condition that the pixel variance of the current 2N×2N block is less than the threshold value.

17. The non-transitory storage medium according to claim 15, wherein the block merging operation comprising a first merging of 2N×2N block, the first merging of 2N×2N block is executed by:

determining whether the current 2N×2N block is the last block of a current 4N×4N block;

determining whether the current 4N×4N block comprises N×N block upon the condition that the current 2N×2N block is the last block of the current 4N×4N block;

determining whether the average values of pixels of four 2N×2N blocks in the current 4N×4N block are similar upon the condition that the current 4N×4N block does not comprise N×N block;

executing the first merging by merging the four 2N×2N blocks in the current 4N×4N block into one block upon the condition that the average values of pixels of the four 2N×2N blocks in the current 4N×4N block are similar.

18. The non-transitory storage medium according to claim 17, wherein the average values of pixels of the four 2N×2N blocks in the current 4N×4N block are determined to be similar upon the condition that a deviation of the average values of pixels between every two 2N×2N blocks of the current 4N×4N block is less than a preset value.

19. The non-transitory storage medium according to claim 17, wherein the first merging of 2N×2N block is executed by:
determining that the block merging operation is ended upon the condition that the current 4N×4N block comprises N×N block or that the average values of pixels of the four 2N×2N blocks in the current 4N×4N block are not similar.

20. The non-transitory storage medium according to claim 17, wherein the first merging of 2N×2N block is executed by:
determining whether a second merging of 4N×4N block is needed upon the condition that the current 4N×4N block comprises N×N block, or that the average values of pixels of four 2N×2N blocks in the current 4N×4N block are similar, or that the first merging is executed.

21. The non-transitory storage medium according to claim 20, wherein the second merging of 4N×4N block is executed by:
determining whether the current 2N×2N block is the last block of a current 8N×8N block;
determining whether the current 8N×8N block comprises blocks less than 4N×4N upon the condition that the current 2N×2N block is the last block of the current 8N×8N block;
determining whether the average values of pixels of four 4N×4N blocks in the current 8N×8N block are similar upon the condition that the current 8N×8N block does not comprise blocks less than 4N×4N block;
executing the second merging by merging the four 4N×4N blocks in the current 8N×8N block into one block upon the condition that the average values of pixels of the four 4N×4N blocks in the current 8N×8N block are similar.

* * * * *